United States Patent
Brooks (10) Patent No.: US 10,224,742 B2
(45) Date of Patent: Mar. 5, 2019

(54) HIGH EFFICIENCY UNINTERRUPTIBLE POWER SUPPLY WITH NEAR LOSS-LESS ULTRAFAST ELECTROMECHANICAL SWITCHING

(71) Applicant: Elliot N Brooks, Foothill Ranch, CA (US)

(72) Inventor: Elliot N Brooks, Foothill Ranch, CA (US)

(73) Assignee: Powerpath Technologies Incorporated, Prosper, TX (US)

(*) Notice: Subject to any disclaimer, the term of this patent is extended or adjusted under 35 U.S.C. 154(b) by 304 days.

(21) Appl. No.: 15/075,091

(22) Filed: Mar. 18, 2016

(65) Prior Publication Data

US 2017/0033596 A1 Feb. 2, 2017

Related U.S. Application Data

(60) Provisional application No. 62/104,849, filed on Jan. 18, 2015.

(51) Int. Cl.
*H02H 3/00* (2006.01)
*H02J 9/06* (2006.01)
*H01H 50/00* (2006.01)

(52) U.S. Cl.
CPC ............ *H02J 9/062* (2013.01); *H01H 50/00* (2013.01)

(58) Field of Classification Search
CPC ...................................................... H02J 9/062
See application file for complete search history.

(56) References Cited

U.S. PATENT DOCUMENTS

| | | | |
|---|---|---|---|
| 1,711,285 A | 4/1929 | Petersen | |
| 3,588,769 A | 6/1971 | Buckwalter | |
| 4,763,013 A * | 8/1988 | Gvoth, Jr. | H02J 9/062 307/46 |
| 4,763,014 A | 8/1988 | Gvoth, Jr. | |
| 4,983,859 A | 1/1991 | Nakajima | |

(Continued)

FOREIGN PATENT DOCUMENTS

| | | |
|---|---|---|
| EP | 2506272 | 10/2013 |
| WO | 2008139250 | 11/2008 |

(Continued)

*Primary Examiner* — Stephen W Jackson (57) ABSTRACT

A UPS system and mechanical switching arrangement therefor that is driven by an electromechanical actuator when a fault condition is detected thereby opening or closing a switch of the switching arrangement in response thereto within 8 milliseconds, preferably within 4 milliseconds, and more preferably within 2 milliseconds of a fault condition being detected. The UPS system has one switching arrangement for controlling current flow through a utility power path that is switched by an electromechanical actuator and another switching arrangement for controlling that is switched by an electromechanical actuator through an inverter power path that supplies an output-connected load with electrical power should a fault condition occur. The switching arrangements can be driven by a common electromechanical actuator or independent driven by separate electromechanical actuators enabling programmability of a plurality of different UPS system operating modes.

20 Claims, 4 Drawing Sheets

(56) References Cited

U.S. PATENT DOCUMENTS

| | | | |
|---|---|---|---|
| 5,315,533 A * | 5/1994 | Stich | H02J 9/062 |
| | | | 307/66 |
| 5,422,808 A * | 6/1995 | Catanese, Jr. | G05B 19/4063 |
| | | | 307/132 E |
| 5,864,274 A | 1/1999 | Steingroever | |
| 6,122,181 A | 9/2000 | Oughton, Jr. | |
| 6,292,379 B1 | 9/2001 | Edevold | |
| 6,657,321 B2 | 12/2003 | Sinha | |
| 6,879,060 B2 | 4/2005 | Hohri | |
| 7,372,177 B2 | 5/2008 | Colombi | |
| 7,456,520 B2 | 11/2008 | Colombi | |
| 7,679,849 B2 | 3/2010 | Lule | |
| 7,768,257 B2 | 8/2010 | Lueck | |
| 7,777,600 B2 | 8/2010 | Brooks | |
| 7,888,816 B2 * | 2/2011 | Zajkowski | H02J 9/061 |
| | | | 307/64 |
| 8,134,437 B2 | 3/2012 | Brooks | |
| 8,134,438 B2 | 3/2012 | Brooks | |
| 8,193,881 B2 * | 6/2012 | Yuba | H01H 9/443 |
| | | | 335/128 |
| 8,659,376 B2 | 2/2014 | Gruden | |
| 8,665,046 B2 | 3/2014 | Staniewicz et al. | |
| 8,686,814 B2 | 4/2014 | Bach | |
| 8,791,779 B2 | 7/2014 | Jonsson | |
| 9,059,624 B2 | 6/2015 | Kim | |
| 9,330,861 B2 | 5/2016 | Evans | |
| 9,479,011 B2 | 10/2016 | Kanakasabai | |
| 2005/0068138 A1 | 3/2005 | Amm | |
| 2008/0257667 A1 | 10/2008 | Hamann | |
| 2014/0203648 A1 | 7/2014 | Siglock et al. | |
| 2014/0266520 A1 | 9/2014 | Jeong | |
| 2016/0268032 A1 | 9/2016 | Mecklenburg | |
| 2016/0329742 A1 | 11/2016 | Singer et al. | |

FOREIGN PATENT DOCUMENTS

| | | |
|---|---|---|
| WO | 2011003547 | 1/2011 |
| WO | 2012084682 | 6/2012 |
| WO | 2014095272 | 6/2014 |

* cited by examiner

HIGH EFFICIENCY UNINTERRUPTIBLE POWER SUPPLY WITH NEAR LOSS-LESS ULTRAFAST ELECTROMECHANICAL SWITCHING

CROSS-REFERENCE

This application claims priority in U.S. Provisional Patent Application No. 62/104,849, filed Jan. 18, 2015, under 35 U.S.C. § 119(c), the entirety of which is hereby expressly incorporated herein by reference.

FIELD

The present invention is directed to uninterruptible power supplies and more particularly to an uninterruptible power supply configured for use with a switching arrangement driven by a high speed electromechanical actuator and a high speed high efficiency electromechanically switched uninterruptible power supply system using such a high speed electromechanical actuator for switching electrical power.

BACKGROUND

An uninterruptible power supply or uninterruptible power source (UPS) is an electrical system that temporarily supplies electrical power to a load, such as a computer system, when the input power source, typically utility power, powering the load is disrupted, in order to maintain reliable operation of the load. A UPS system is typically used to protect hardware, such as computers, data centers, telecommunications equipment, medical equipment, and other types of mission critical electrical equipment, where an unexpected power disruption could have very serious adverse consequences.

UPS systems have become an essential part of any reliable computer system, to prevent the loss of critical data during an over-voltage, under-voltage, or complete loss of voltage event. Over the years, UPS systems have become increasingly reliable to the point where their performance has become rather generic, shifting the competition to efficiency. This is especially true for high-power UPSs, and specifically in large data centers. In these installations, power consumption has become the major cost, so maximizing power efficiency is increasingly important, both to reduce the direct cost of the electricity consumed, but also to reduce the size and cost of the cooling systems needed to keep the computer equipment operating in a reliable temperature range.

UPS use has grown as the UPS has become an essential part of any reliable computer system, to prevent the loss of critical data during over-voltage, under-voltage, or complete loss of voltage events. Over the years, the UPS has become increasingly reliable to the point where UPS performance has become secondary to efficiency. This is especially true for high-power UPSs, and even more true with regard to mission critical UPSs used in large data centers. In these installations, power consumption is such a major cost, maximizing UPS power efficiency has become increasingly important, both to reduce the amount of electricity consumed, but also to reduce the size and cost of cooling systems needed to keep the computer equipment operating in a reliable temperature range.

Unfortunately, there is a limit to how much UPS power consumption can be reduced because they use semiconductor power switching arrangements, typically SCR switches, which must remain powered during UPS operation.

What is needed is needed is a UPS system that overcomes at least some of these drawbacks. What is also needed is a UPS system that is more efficient, more reliable and more cost effective.

SUMMARY

The present invention is directed to (a) an electromechanical actuator that preferably is a high speed electromechanical actuator that is used to drive a mechanical switch that preferably is a high speed electromechanical switch usable in electrical power switching applications, and (b) an electrical power transfer switch that preferably is a uninterruptible power supply (UPS) system utilizing a high speed electromechanical actuator in accordance with the present invention configured to drive a mechanical switch producing a high speed electromechanical switch. The present invention also is directed to such an electrical power transfer switching arrangement employing a high speed electromechanical actuating switch that preferably is of uninterruptible power supply switching arrangement construction. In a preferred embodiment, the present invention is directed to an uninterruptible power supply that preferably is of lossless construction that utilizes a high speed electromechanical switch. The present invention is directed to the electromechanical actuator, electromechanical switch, electrical power transfer switching circuit schematics, and uninterruptible power supply circuit schematics shown in the accompanying drawings of this application.

A UPS system constructed in accordance with the present invention overcomes many of the disadvantages of convention UPS systems which use semiconductor switches producing a UPS system where all power switching is done using mechanical switches driven by an electromechanical actuator with each switch preferably separately and independently driven by its own electromechanical actuator. Such a UPS system not only reduces power losses by not using semiconductor switches when a fault condition occurs, but having each mechanical switch of the UPS system of the present invention driven by its own electromechanical actuator provides the ability to program the UPS to operate in one of a (a) an online or double-conversion UPS operating mode, (b) an offline UPS operating mode, and (c) a line-interactive UPS operating mode. In a preferred embodiment, such a UPS system can be configured in one of such a plurality of operating modes and also is therefore reconfigurable or re-programmable from operating in one mode to operate thereafter in another mode.

In its rest state, a high speed electromechanical switch in accordance with the present invention passes the power through a simple mechanical switching arrangement employing a mechanical electrical switch, eliminating the voltage drop experienced by existing SCR switches used in conventional UPS system. In a preferred UPS system embodiment where configured as an off-line UPS, a UPS system with mechanical power path switching arrangements driven by electromechanical actuators produces a UPS system of the present invention that is at least 97% efficient, preferably at least 98% efficient and which is essentially 100% efficient, i.e., at least 98.5% efficient, and which can be configured as a line-interactive UPS system that is at least 90%, preferably at least 95% and more preferably at least 97% efficient. In addition, the speed of the electromechanical actuator powered mechanical switch of the present invention preferably can and does exceed the switching speed of an SCR switch used in conventional UPS systems, producing electromechanically switched UPS systems of the present invention that possess improved performance characteristics in nearly every UPS class by advantageously reducing output transient voltage during an input power quality failure event, e.g., fault condition, in off-line and line-interactive UPS system mode operation, and during a hardware failure in nearly all UPS classes.

Various other features, advantages and objects of the present invention will be made apparent from the following detailed description and the drawings.

DRAWING DESCRIPTION

One or more preferred exemplary embodiments of the invention are illustrated in the accompanying drawings in which like reference numerals represent like parts throughout and in which.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

The present invention is directed to an uninterruptible power supply, uninterruptible power source, or UPS system, having improved performance and providing increased efficiency over conventional UPS systems presently in use. Before discussing the present invention in considerable detail hereinbelow with regard to FIGS. 2-7B, a brief introduction to conventional UPS systems is discussed immediately below with reference to FIG. 1.

Introduction

Figure 1:
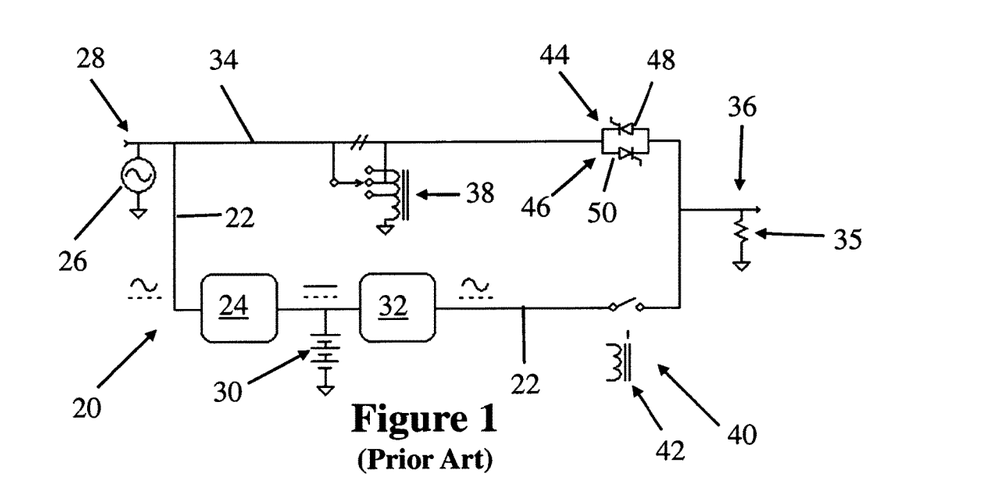
FIG. 1 is a schematic diagram of a conventional prior art uninterruptible power supply (UPS) system employing a power-inefficient semiconductor output power switching arrangement.

FIG. 1 schematically illustrates a generic example of a conventional UPS system 20 that is presented together with the accompanying discussion below in order to not only provide a helpful general introduction to UPS systems, but also to set the stage for highlighting the novelty, differences, unique features, and advantages of a UPS system constructed in accordance with the present invention discussed in even more detail further below. Existing UPS systems are divided into three general classes: on-line, off-line, and line-interactive. The differences in the classes of present days UPS systems result from differences in their design details and over-all control strategy. Since the generic conventional UPS system 20 shown in FIG. 1 is broadly representative of virtually all of the current UPS topologies presently in use, the differences between each of the three UPS system classes are described below with reference to conventional UPS system 20 of FIG. 1.

With continued reference to FIG. 1, conventional UPS system 20 has a first power path 22 with a charging circuit 24 that uses source or input electrical power 26, such as alternating current utility power, connected to a UPS input 28 to charge an electrical power storage device 30, e.g., battery or batteries, whose direct current electrical power output is converted by an inverter 32 into alternating current electrical power for output by the UPS 20 when the first power path 22 is active during operation of the UPS 20. Conventional UPS 20 has a second power path 34 used to connect the source 26 to an output 36 of the UPS 20, either directly, or indirectly through a voltage compensating circuit 38 configured to automatically raise or lower output line voltage to compensate for minor variations in the voltage of the source 26. UPS output 36 is connected to an electrical load 35, such as computer hardware, electrically powered medical devices, telecommunications equipment, or other electrical equipment protected by the UPS 20. Conventional UPS 20 also includes an automated switching system 40 that closes one switch arrangement 42 when it is desired to route power through one power path 22 to the UPS output 40 and closes another switch arrangement 44 when it is desired to route power through the other power path 32 to output 40.

In an on-line or double-conversion class of UPS system, the main or inverter power path 22 is normally powered or on by the switching system 40. As electrical power is continuously supplied to the UPS output 36 from battery 30 via inverter 32, there is no interruption to output power supplied to the load 35, even briefly, if input or source power 26 is lost. The second or bypass power path 34 is used only the event of a hardware failure in the main power path 22. The control circuit of such a UPS system of this class must detect such a failure and quickly switch to the bypass power path 32 using switching system 40.

To switch from the main power path 22 to the bypass power path 34 quickly enough to provide the load 35 with substantially uninterrupted electrical power, the bypass switching arrangement 44 is a solid-state switching arrangement 46 that uses silicon-controlled rectifiers (SCRs) 48, 50. When the bypass switching arrangement 44 is closed to route power to the bypass path 34, main path switching arrangement 42 is opened to disconnect the faulty main power path 22 stopping electrical power flow through path 22.

While an SCR-based bypass switching arrangement 46 can turn on and route power through the bypass path 34 in microseconds, their use of SCRs 48, 50 is not only a significant source of power loss due to SCRs rather large voltage drop, typically one volt or more, but they thereby also require the use of expense-adding heat sinks and costly, power consuming cooling devices, e.g., cooling fans. Using SCRs 46, 48 in such a bypass switching arrangement 44 causes a decrease in efficiency resulting not only from their at least one-volt drop but also from their inherent switching delay of up to ½ cycle of AC power, i.e., up to 8 microseconds, needed to turn off. While some of these types of UPS systems, typically smaller ones, use a conventional relatively slow mechanical relay in their bypass path switching arrangement 46, as this eliminates the voltage drop, they unfortunately suffer from much slower switching times typically of at least 10 mSec and which can be as long as 100 mSec, during which output power to the load 35 may be interrupted too long or otherwise undesirably compromised in a manner that adversely impacts operation of the load 35.

While online or double-conversion UPS systems provide high output quality, they do so at the expense of having the worst efficiency of any kind of UPS, as power is continuously supplied through two switching power converters, namely the battery charger 24 and inverter 32. These types of UPS systems unfortunately are also the costliest since each one of the switching power converters, namely the battery charger 24 and inverter 32, must both be rated and cooled for continuous operation.

In an off-line UPS system, the bypass and main power paths are reversed with output power continuously supplied from the UPS input 28 along power path 34, which in this case is the main path, to the UPS output 36. In some versions, only when the voltage of the input electrical power 26 drops out of or varies beyond acceptable limits does the UPS switching system 40 switch to the other power path 22, which in this case is the bypass path, thereby supplying output power from the inverter 32 to power the load 35. In other versions, switching system 40 is normally closed, with the inverter 32 electrically connected to the output 36 but electronically set in an inactive, high impedance state.

Conventional UPS 20 automatically senses the voltage of the input power 26, typically utility power, and switches to utility with switching system 40 operating switching arrangements 42 and 44 accordingly. Typically, switching arrangement 42 of the inverter path 22 is switched on so the inverter 32 supplies electrical power from battery 30 to the UPS output 36 connected to the load 35 to maintain continuous electrical power to the load 35 when a problem occurs. However, the main path 34 must be disconnected by switching arrangement 44 being opened before the electrical power from the inverter 32 can be supplied via path 22 to the UPS output 36. Since the speed of the main path switching arrangement 44 is critical to minimize any disturbance in output voltage, a solid-state switching arrangement 46 with SCRs 48, 50 is used. The bypass path switching arrangement 42 typically is a relatively slow conventional mechanical relay that opens only on a failure in the inverter path 22 when on utility.

An off-line UPS system is more efficient than an on-line UPS system, since the supply of continuous electrical power to the UPS output 36 to power the load 35 is supplied directly from the input power source 26, e.g., utility power, so that the main source of electrical power loss during UPS operation is caused by the SCRs 48, 50 used in switching arrangement 44. The use of SCRs 48, 50 in such a UPS switching arrangement 44 is less than desirable because the SCRs 48, 50 have an operating or "on" voltage drop of more than 1 volt, which sets an absolute upper limit on efficiency, and require up to ½ cycle of AC power from the input power source 26 to turn off, during which the output power may be compromised. The problem of output power becoming compromised during bypass switching can become exacerbated by the fact that further switching delay can occur due to the time needed for the relatively slow relay of the bypass switching arrangement 42 to close.

Off-line UPS systems have a cost advantage as the complex charger and inverter circuits 24 and 32 of the inverter path 22 do not continuously operate and therefore only need to be rated and cooled for short-term use during an input power quality failure event. Unfortunately, off-line UPS systems perform more poorly than on-line UPS systems as they cannot compensate for even small fluctuations in the voltage of the input or utility power source 26 that can and often do occur.

The last class of UPS systems are line-interactive UPS systems. A line-interactive UPS system is configured generally the same as an off-line UPS system, except for the addition of voltage compensating circuit 38 capable of at least slightly raising or lowering the voltage of the source or utility power source 26 to compensate for utility voltage variations. A classic prior art line-interactive UPS system is a 50/60 Hz autotransformer with automated tap switches. This type of line-interactive UPS system is typically limited in application to smaller power levels due to the size and cost of the autotransformer, although a topology replacing the bulky autotransformer with a smaller high-frequency converter in series with the utility has also been developed. While a line-interactive UPS system has cost and efficiency advantages over on-line UPS systems for the same reasons as off-line UPS systems, they are also not without significant drawbacks. A line-interactive UPS system provides improved performance over a simple off-line UPS system as it can compensate for small fluctuations in utility voltage with better efficiency that an on-line UPS system, but it still unfortunately suffers from the same output voltage transients caused by the delay in turning off the switching arrangement 44 of the directly connected power path 32, and from the same voltage loss due to the SCRs 48, 50 used in solid state switch 46 as a simple off-line UPS.

Based on the relative strengths and weaknesses of each of these UPS system topologies, the higher power UPS market has been dominated in the past by on-line UPS systems, with smaller line-interactive UPS systems making up the bulk of lower power units, and simple off-line UPS systems relegated to the smallest and lowest cost units. Over time, however, as power consumption efficiency has become more important, improved line-interactive UPS systems have become increasingly used at higher power levels. While improvements in UPS power efficiency have been significant to date, since virtually all of these UPS system use at least one power path switching arrangement with solid state SCRs, there is an absolute efficiency limit as a result of using SCRs. As also previously indicated, in addition to limiting power efficiency attainable by such UPS systems, the use of SCR-based solid state switching arrangements also suffer from switching speed performance limitations that also limit present day UPS system performance.

Ultrafast Electromechanically Switched UPS System

Figure 2:
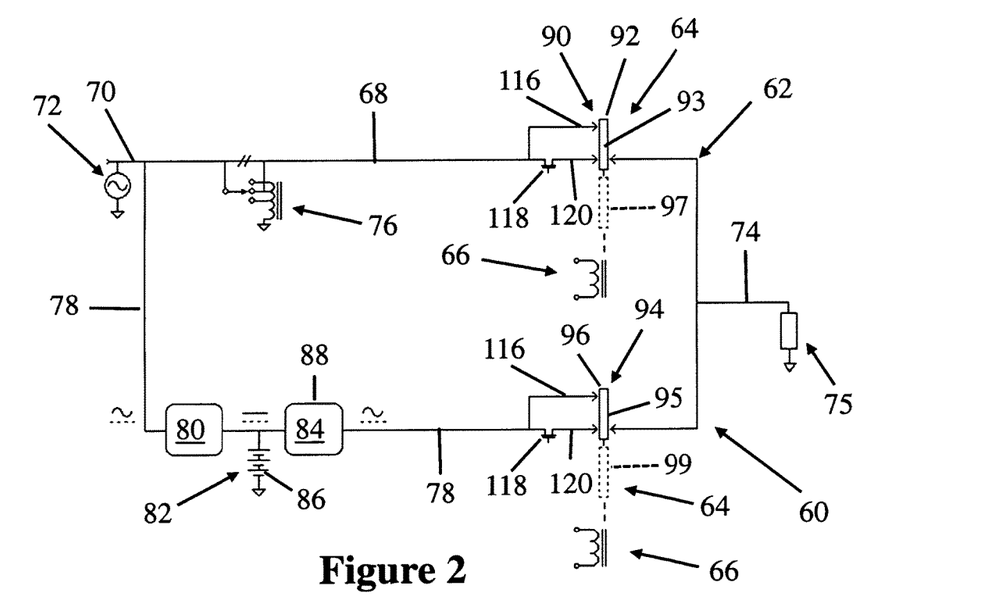
FIG. 2 is a schematic diagram of a preferred embodiment of a UPS system of the present invention that eliminates use of semiconductor switches in favor of a more power efficient high speed electromechanical output power switching arrangement.
Figure 3:
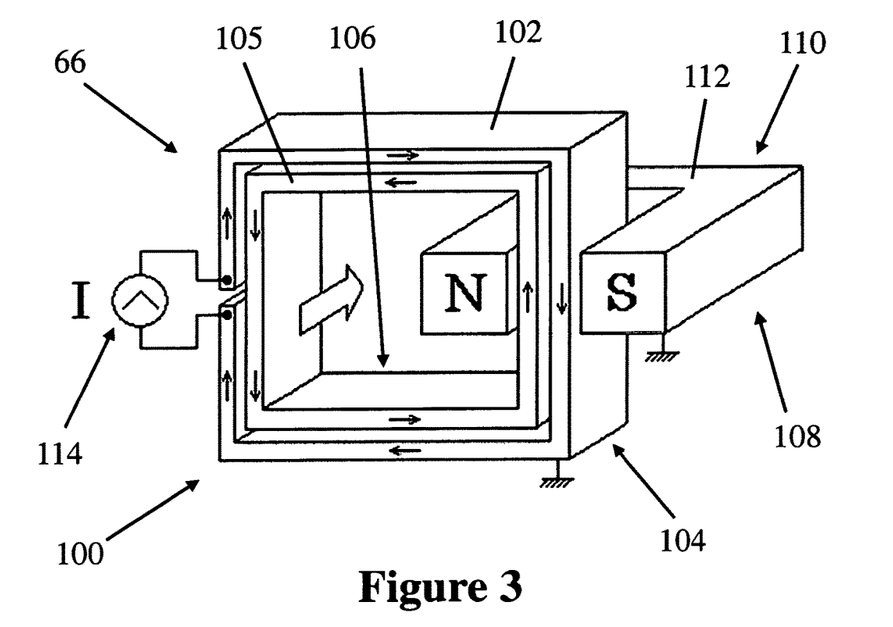
FIG. 3 is a partial fragmentary perspective cross-sectional view of a high speed electromechanical UPS power switching actuator usable in the preferred embodiment of the UPS system schematically depicted in FIG. 2.

With reference to FIGS. 2 and 3, the present invention is directed to an ultrafast electromechanically switched UPS system 60 having an uninterruptible power supply power output switching circuit arrangement 62 with a high speed reduced power electromechanical power path switching arrangement 64 driven by a high speed low power electromechanical power path switch actuator 66 producing such a UPS system constructed in accordance with the present invention that uses less power while providing faster and preferably more reliable power output switching than conventional UPS systems equipped with solid-state switching arrangements using SCRs. Such a UPS system 60 constructed in accordance with the present invention preferably is of near-lossless construction as it uses an electromechanical power output switching arrangement 62 driven by an electromechanical actuator 66 that switches over between the main and bypass power paths more quickly virtually eliminating switchover transients that have plagued conventional UPS systems in the past.

The UPS circuit 62 shown in FIG. 2 has a utility power path 68 that is an electrical circuit branch extending between an electrical power input 70 of the UPS system 60 that is connected to source or input electrical power 72, such as alternating current utility power, which supplies the electrical power to an electrical power output 74 of the UPS system 60 connected to an electrical load 75 during normal operation when power from source or input electrical power 72 is provided without interruption. If desired, the utility power path 68 can have a voltage compensation circuit 76, like that discussed above, which is configured to automatically raise or lower the voltage outputted by the output 74 to load 75. Such a voltage compensation circuit 76 can be and preferably is a line voltage compensation circuit as is known in the art that can include a voltage sag, dip or drop compensator, an overvoltage compensator, or a combination thereof. For maximum speed and efficiency, tap-switching mechanisms inside such a voltage compensation circuit can also employ the same high speed switching system 64 described herein thereby advantageously providing better more optimal performance and efficiency.

With continued reference to FIG. 2, the UPS circuit 62 has an inverter power path 78 that is an electrical circuit branch in parallel with the utility power path 68 which also is electrically connected to the input 70 such that the inverter path 78 is also supplied with electrical power from source 72. Electrical power from source 72 via input 70 is supplied to a charging circuit 80 and can do so substantially simultaneously while electrical power from source 72 also is being substantially continuously supplied to the output 74 of the UPS system 60 during normal operation. The electrical power from source 72 supplied to charging circuit 80 charges an electrical power storage device 82 during normal operation so that electrical power will become nearly instantly available from the electrical power storage device 82 to be supplied from the electrical power storage device 82 when electrical power from source 72 is interrupted. As is also shown in FIG. 2, the inverter power path 78 can and preferably does include an electrical power conditioning circuit or device 84 used to condition electrical power outputted by the electrical power storage device 82 during UPS operation of UPS system 60 when normal operation is interrupted due to a disturbance or interruption in electrical power being supplied by source 72.

In a preferred embodiment, electrical power storage device 82 is formed of at least one battery and/or at least one ultra-capacitor and, if desired, can be formed of a plurality of batteries and/or ultracapacitors connected in series and/or parallel. In the preferred UPS system shown in FIG. 2, electrical power storage device 82 is formed of a plurality of batteries 86 and can be formed of a plurality of pairs, i.e., at least three, of batteries 86 connected in series, in parallel, or in a combination of series and parallel. Electrical power conditioning circuit or device 84 preferably is or includes an inverter 88 that converts direct current electrical power from electrical power storage device 84 into alternating current electrical power. If desired, electrical power condition circuit or device 84 can also further include a voltage compensation circuit, such as a voltage compensation similar to voltage compensation circuit 76 discussed above.

Such a UPS system 60 constructed in accordance with the present invention has an electromechanical switching arrangement 64 driven by at least one electromechanical power path switch actuator 66 advantageously replacing and eliminating any solid-state or semiconductor switches, e.g., SCRs, previously used in conventional UPS systems thereby producing a UPS system 60 of ultrafast, low power and high efficiency construction. As shown in FIG. 2, electromechanical power path switching arrangement 64 of UPS system 60 has a utility power path switching arrangement 90 with a utility power path switch 92 driven or switched by electromechanical switch actuator 66 and an inverter power path switching arrangement 94 with an inverter power patch switch 96 driven or switched by electromechanical switch actuator 66 that can be the same or different from the electromechanical switch actuator 66 used to drive or switch the utility power path switch 92.

In one preferred embodiment of a UPS system constructed in accordance with the present invention, the utility power path switching arrangement 90 is driven or switched by an electromechanical switch actuator 66 separate from an electromechanical switch actuator 66 used to drive or switch inverter power path switching arrangement 94 such that UPS system 60 has at least a plurality of electromechanical switch actuators 66 with one of the electromechanical switch actuators 66 operatively connected to a movable electrical switch contact 93, e.g., relay contact, of the utility power path switch 92 of switching arrangement 90 and another one of the electromechanical switch actuators 66 operatively connected to a movable electrical switch contact 95 of the inverter power path switch 96 of switching arrangement 94. The movable switch contact 93 of the utility power path switch 92 of the utility power path switching arrangement 90 is shown in FIG. 2 in a closed position and the movable switch contact 95 of the inverter power path switch 96 of the inverter power path switching arrangement 94 also is shown in FIG. 2 in its closed position. Movable switch contact 93 of the utility power path switch 92 of the utility power path switching arrangement 90 can be moved by electromechanical switch actuator 66 away from the closed position to an open position 97 disposed away from the closed position shown in FIG. 2 such as by being moved to the open position 97 depicted by dashed lines or shown in phantom as also illustrated in FIG. 2. Likewise, movable switch contact 95 of the utility power path switch 96 of the utility power path switching arrangement 94 is also movable by electromechanical switch actuator 66 away from the closed position to an open position 99 disposed away from the closed position shown in FIG. 2 such as by being moved to the open position 99 depicted by dashed lines or shown in phantom as also illustrated in FIG. 2.

Such a UPS system 60 preferably is configured, including in software and/or firmware, to be able to operate the utility power path switching arrangement 90 independently of the inverter power path switching arrangement 94 by controlling actuation of the electromechanical switch actuator 66 that drives utility power path switch 92 by moving its respective contact 93 independently of controlling actuation of the electromechanical switch actuator 66 that drives inverter power path switch 96 by moving its respective contact 95. If desired, such a UPS system 60 can be configured, such as in software and/or firmware, to operate the utility power patch switch 92 and the inverter power patch switch 96 substantially in unison by actuating each electrical switch actuator 66 to drive or move respective electrical switch contacts 93 and 95 substantially in unison.

In another preferred embodiment of a UPS system constructed in accordance with the present invention, operation of the utility power path switching arrangement 90 and the inverter power path switching arrangement 94 are controlled by a single common electromechanical switch actuator 66. In one such preferred embodiment, a single common electromechanical switch actuator 66 is operatively connected to the contact 93 of the utility power patch switch 92 and to the contact 95 of the inverter power path switch 94. In such a preferred embodiment, the single common electromechanical switch actuator 66 is mechanically connected or coupled to both the contact 93 of utility power path switch 92 and to the contact 95 of inverter power patch switch 94 such that actuation of actuator 66 displaces or moves both switch contacts 93 and 95 substantially in unison.

As a result of being configurable in any one or more of the aforementioned configurations, such a UPS system 60 of the present invention can advantageously be configured, such as in hardware and/or software/firmware, to operate as an online or double-conversion UPS system, an off-line UPS system, or as a line-interactive UPS system. Such a UPS system 60 of the present invention can therefore be so configured, via hardware and/or software/firmware, to operate in one of at least a plurality, preferably at least a plurality of pairs, i.e., at least three, of different UPS operating modes, by being configured or configurable to operate in one of (a) an online or double-conversion UPS operating mode, (b) an off-line UPS system operating mode, and (c) a line-interactive UPS operating mode.

In a preferred embodiment of a UPS system of the present invention, UPS system 60 is configurable, preferably user configurable, between one of a plurality of UPS operating modes and can be subsequently reconfigured from one of at least a plurality of UPS operating modes to another one of the at least plurality of UPS operating modes. In another such preferred embodiment, UPS system 60 preferably is configurable, preferably user configurable, between one of a plurality of pairs, i.e., at least three, of UPS operating modes and which also is reconfigurable, preferably via user configuration, between another one of the plurality of pairs of UPS operating modes. In one such preferred embodiment, UPS system 60 is configurable, preferably user configurable, between one of (a) an online or double-conversion UPS operating mode, (b) an offline UPS operating mode, and (c) a line-interactive UPS operating mode and thereafter is reconfigurable by being user reconfigured to operate in a different one of (a) the online or double-conversion UPS operating mode, (b) the offline UPS operating mode, and (c) the line-interactive UPS operating mode.

FIG. 3 illustrates a basic diagram of an electromechanical UPS switch actuator 66 used in at least one preferred embodiment of a UPS system 60 of the present invention that preferably is a high speed electromechanical linear actuator UPS switch drive motor 100 equipped with a fixed or stationary conductor 102, preferably a multi-turn electrical drive coil 104, which electromagnetically displaces or drives a shorted turn conductor or single turn coil 105, preferably a movable or driven coil or armature 106, operatively connected to at least one electrical contact 93 and/or 95 of power path switch(es) 90 and/or 94 to cause the electrical contact 93 and/or 95 of power patch switch(es) 90 and/or 94 to be moved from one of a closed and open position toward and preferably to the other one of the closed and open position. Such a high speed electromechanical linear actuator UPS switch drive motor 100 preferably also includes a source of eddy current focusing magnetic flux 108, preferably a steady state magnetic flux source 110, more preferably a fixed or stationary permanent magnet 112, having one magnetic pole, N, disposed on one side of the drive and driven coils 104, 106 and another magnetic pole, S, disposed on an opposite side of the drive and driven coils 104, 106 that initiate ultra-rapid armature and UPS switch contact movement resulting in ultrafast UPS switch contact opening or closing movement or operation.

Such a high speed electromechanical linear actuator UPS switch drive motor 100 provides ultrafast UPS switch contact opening and closing times that enable each UPS switch contact 93 and/or 95 displaced thereby to move from a closed position to an open position disposed from the closed position within six milliseconds (within 6 mSec), preferably within four milliseconds (within 4 mSec), and more preferably within 2 milliseconds (within 2 mSec). Such a high speed electromechanical linear actuator 100 used as a UPS switch actuator 66 of a UPS system 60 of the present invention preferably is constructed in accordance with any one more of the inductively driven electromagnetic linear actuator embodiments disclosed in commonly owned U.S. Pat. Nos. 7,777,600, 8,134,437, and 8,134,438, the disclosure of each of which is hereby expressly incorporated herein by reference.

The drive coil 104 of an electromechanical linear actuator UPS switch drive motor 100 used as an electromechanical switch actuator 66 of a UPS system 60 of the present invention is powered by an electrical power supply 114 that includes an electrical power storage device (not shown), such as in the form of one or more capacitors and/or ultracapacitors (not shown), which preferably is charged by the source or input electrical power 72 during normal UPS system operation. In one preferred embodiment, the electrical power storage device of the electromechanical switch actuator power supply 114 provides all of the electrical current used to electrically power the drive coil 104. When the drive coil 104 is electrically powered, it generates a magnetic field that displaces the armature 106 thereby causing a corresponding one of the switch contacts 93 and/or 95 to move to turn on or off the corresponding switch 92 and/or 96 of respective power path switching arrangement 90 and/or 94. In a preferred embodiment, power supply 114 is bidirectional with drive current of one polarity supplied to electromechanical switch actuator when it is desired to move relay contact 93 and/or 95 in one direction, such as to open or close a power path switch, such as when a fault condition has been detected, and drive current of an opposite polarity supplied electromechanical switch actuator when it is desired to move relay contact 93 and/or 95 in an opposite direction, such as to close or open the power path switch, such as when the UPS system 60 has been reset after the fault condition has passed.

In a preferred embodiment, electromechanical switch actuator power supply 114 is powered by the same electrical power storage device 82 used to supply electrical current to the UPS output 74 to power load 74 upon occurrence of a fault condition. When power storage device 82 is charged by charger 60 during normal operation of UPS system 60, it also charges the same power storage device 82 used to supply electrical current to electromechanical switch actuator power supply 114 to power electromechanical switch actuator when it is desired to move relay contact 93 and/or 95 of corresponding one or both power path switches 92 and/or 96 from a closed position to an open position, such as when a fault condition has been detected. In one such preferred embodiment, when a fault condition is detected, power supply 114 of electromechanical switch actuator used to open utility power path switch 92 draws electrical power from power storage device 82 to do so with electrical power from power storage device 82 also being supplied to inverter 84 to provide electrical current through the inverter power path 78 through closed switch 96 to output 74 where the current powers load 75 during the fault condition.

With continued reference to FIG. 2, a preferred electromechanical power path UPS system switching arrangement 64 has a fixed main electrical power input contact 116 extending from a respective power path 68 or 78 that makes electrical contact with a corresponding one of the movable power path switching relay contacts 93 or 95 of respective power path switching arrangement 90 or 94 when the corresponding switch 92 or 96 is located in a closed position (like the respective closed positions of contacts 93 and 95 shown in FIG. 2). Each switching arrangement 64, i.e., utility power path switching arrangement 90 and inverter power path switching arrangement 94, preferably also includes a snubber circuit 118 downstream of the fixed main input contact 116 that is in series with a snubber input contact 120 and which makes contact with movable power path switching relay contact 93 or 95 before relay contact 93 or 95 makes contact with fixed main input contact 116 during switch closing, or during making of electrical switching contact during closing, and which breaks contact with movable power path switching relay contact 93 or 95 after first breaking contact with fixed main input contact 116 during switch opening.

As discussed below in more detail, each UPS switching arrangement 64, including both the utility power path switching arrangement 90 and the inverter path switching arrangement 94 of such a UPS system 60 constructed in accordance with the present invention, preferably is a snubberized switching arrangement well suited for minimizing and preferably substantially completely preventing arcing during such high speed power path switching during UPS system enabling switching to occur in no more than eight milliseconds, preferably no more than six milliseconds, more preferably no more than four milliseconds, and even more preferably no more than two milliseconds producing a UPS system 60 of the present invention where the electromechanical switch actuator opens or closes each power path switch 92 or 96 in no more than eight milliseconds, preferably no more than six milliseconds, more preferably no more than four milliseconds, and even more preferably no more than two milliseconds. Such an ultrafast high speed low power electromechanically driven power path switching arrangement 64 produces power path switching arrangements 90 and 94 having a no more than eight millisecond, preferably no more than six millisecond, more preferably no more than four millisecond, and even more preferably no more than two millisecond power path switch opening time and/or power path switch closing time provided by high speed electromechanical switching actuator 66.

Figure 4:
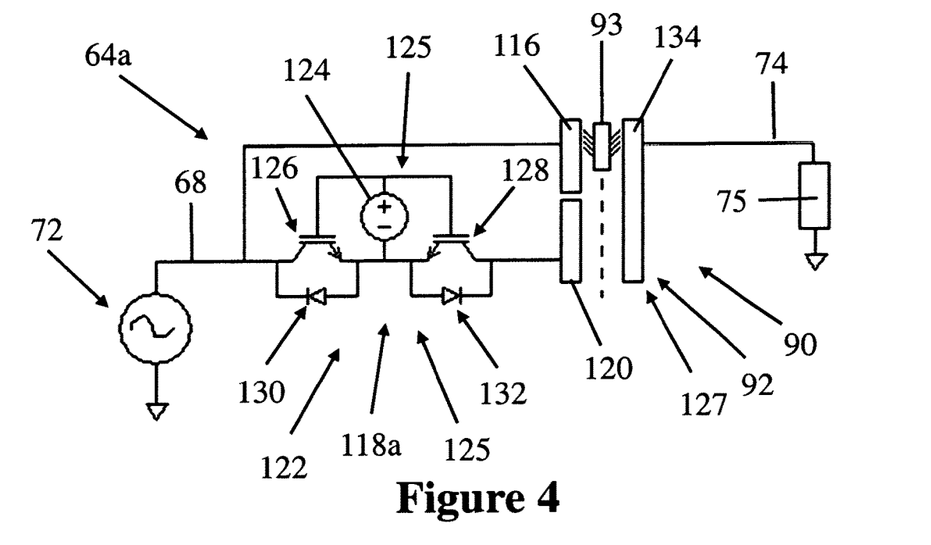
FIG. 4 is a first preferred embodiment of a snubberized UPS power path switching arrangement usable as either or both a utility power path switching arrangement and/or inverter path switching arrangement that employs an active snubber configured in accordance with the present invention.

FIG. 4 illustrates a first preferred embodiment of a snubberized UPS switching arrangement 64a configured for high speed UPS system switching operation when driven or switched by high speed electromechanical actuator 66 during operation of UPS system 60. Snubberized UPS switching arrangement 64a shown in FIG. 4 is depicted as used as utility power path switching arrangement 90 for purpose of describing its construction and operation but can also be used as inverter power patch switching arrangement 94. In a preferred UPS system embodiment, both the utility power path switching arrangement 90 and the inverter power patch switching arrangement 94 both employ such a snubberized UPS switching arrangement 64a in accordance with that depicted in FIG. 4.

The snubber circuit 118a of the snubberized switching arrangement 64a shown in FIG. 4 is a solid state AC/DC switch 122 used as a solid state relay 125, or SSR 125, in the present snubber circuit 118a that is combined with a mechanical relay 127 formed by fixed main input contact 116 and fixed snubber input contact 120 disposed on one side of movable switch relay contact 93 and by fixed output contact 134 disposed on the other side of movable switch relay contact 93. As is shown in FIG. 4, SSR 125 has a snubber driver 124 with one polarity connected to the base of each one of a pair of switching semiconductors 126, 128, each of which preferably is a transistor 126, 128, which in turn have their respective emitters connected to one another and to a corresponding one of a pair of snubber diodes 130, 132 that are each also connected to a respective collector of corresponding transistor 126, 128.

SSR 125 of active snubber circuit 118a is connected in series between the input 70 or source 72 and snubber contact 120 as depicted in FIG. 4. One such snubber circuit 118a preferably is connected between the utility power path 68 and corresponding snubber contact 120 of utility power path switching arrangement 90 and another such snubber circuit 118a preferably also is connected between the inverter power path 78 and corresponding snubber contact 120 of inverter power path switching arrangement 94 such that each electromechanically switched power path switching arrangement 64a, preferably at least power path switching arrangements 90 and 94, have such a snubber circuit 118a employing an SSR 125 along with the relay contact arrangement 127 shown in FIG. 4. With regard to the inverter power path switching arrangement 94, inverter power path switching arrangement 94 is essentially the same as that shown in FIG. 4 with the exception that switch relay contact 93 is replaced by switch relay contact 95 and utility power path 68 is replaced with inverter power path 78.

In use and operation during opening of utility power path switch 92 of utility power path switching arrangement 90, switch relay contact 93 is a movable contact 93 that is initially at rest and in a closed position, such as the closed position shown in both FIG. 2 and FIG. 4, thereby making electrical contact with fixed main input contact 116 and fixed output contact 134 allowing electrical current flow from source 72 or input 70 to output 74 and load 75. If desired relay contact 93 can also be in electrical contact with snubber contact 120 when switch 96 of switching arrangement 90 is in the closed position, such as the closed position shown both in FIG. 2 and FIG. 4. When switching arrangement 64 closed, e.g., in the present case when utility power path switch 96 is closed, current flows from source 72 through corresponding power path 68, through fixed main contact 116, through movable relay contact 93, through fixed output contact 134, through output 74 and to load 75.

Although not shown, when the other switching arrangement 64 is closed, namely when inverter path switch 96 of inverter path switching arrangement 94 is closed, electrical power can and preferably does flow through inverter power path 78, such as electrical current from power storage device 82 outputted by inverter 84, through fixed main contact 116, which flows through movable inverter path relay contact 95, through fixed output contact 134, through output 74 and to load 75. When utility power path switch 92 of utility power path switching arrangement 90 is open, such as when an electromechanical power path switch actuator 66 has opened the switch 92 upon occurrence of a fault condition, e.g., interruption in source 72, inverter path switch 96 of inverter path switching arrangement 94 is closed by an electromechanical power path switch actuator or remains closed such that electrical power from power storage device 82 is outputted by inverter 84 and flows through fixed main contact 116, through movable inverter path relay contact 95, through fixed output contact 134, through output 74 and to load 75 ensuring current flow remains supplied to load 75 during UPS system 60 operation.

During opening of utility power path switch 92 of utility power path switching arrangement 90, its corresponding electromechanical power path switch actuator is energized and the SSR 125 is turned on, such as by a controller or control circuitry of the UPS system 60 configured in software and/or firmware to do so, such as upon detection or occurrence of a fault condition. Electrical current is supplied by supply 114 to electromechanical power path switch actuator energizing the actuator thereby causing movable relay contact 93 to begin moving relative to fixed contacts 116 and 134 away from fixed contacts 116 and 134 toward snubber contact 120 in a generally downwardly direction indicated by the dashed lines shown in FIG. 4. As the relay contact 93 begins to move, it electrically contacts snubber contact 120, if not already in contact therewith, while remaining in contact with fixed main contact 116 and fixed output contact 134. Due to a small, but non-zero, voltage drop across the SSR 125 by moving relay contact 93 being in contact with snubber contact 120, current continues to flow through contacts 116, 93 and 134.

When contact between moving relay contact 93 and fixed main contact 116 is broken such that contact 93 becomes open to fixed main contact 116 while contact 93 remains closed to snubber contact 120 and remains closed to fixed output contact 134. Current now flows from source 72 through transistor 126 and snubber diode 130, through transistor 128 and snubber diode 132, through snubber contact 120, through moving relay contact 93, through fixed output contact 134, through output 74 and to load 75. Since SSR 125 has been turned on and possesses a low voltage drop, it snubs or prevents formation of any electrical arc between moving relay contact 93 and either contact 120 and 134 because there is too small of a voltage between open contacts 116 and 93 to cause an arc. Load current is broken which thereby stops currently flow through the switch 92 of switching arrangement 90, preferably instantly stopping current flow therethrough. As electromechanical power path switch actuator continues to displace moving relay contact 93 away from closed position toward open position 97 shown in phantom in FIG. 2, it stops being in electrical contact with both snubber contact 120 and output contact 134 thereby opening switch 92 thereby removing SSR 125 from the load 75. Controller or control circuitry of UPS system 60 preferably is configured in software and/or firmware to cause electromechanical power path switch actuator power supply 114 to fire a braking pulse to beginning stopping and preferably stop relay contact 93 from moving farther away from the closed position such that the contact 93 is retained in an open position 97 disposed away from the closed position. Contact 93 preferably is retained in such an open position 97 until electromechanical power path switch actuator is energized, preferably via supply 114 supplying electrical current of an opposite polarity from that supplied during switch opening, to begin closing switch.

Opening operation of inverter path switch 96 of inverter path switching arrangement 94 is carried out the same way but with its corresponding electromechanical power path switch actuator moving relay contact 95 from the closed position shown in FIG. 4 toward the open position 99 shown in phantom in FIG. 4 until electrical switch contact is broken opening switch 96.

With continued reference to FIG. 4, the sequence for closing the utility power path switch 92 of utility power path switching arrangement 90 is the same as for closing the inverter power path switch 96 of inverter power path switching arrangement 94 with switch closing for both being carried out in reverse order or sequence from the switch opening sequence described above. While the switch closing sequence is described below with regard to closing the utility power path switch 92 of the utility power path switching arrangement 90, it should be recognized that the same switch closing sequence is applicable to closing inverter power path switch 96 of inverter power path switching arrangement 94.

When switch 92 of switching arrangement 90 is open, its relay contact 93 is disposed in an open position, such as the open position 97 shown in phantom in FIG. 2. When the electromechanical power path switch actuator power supply 114 is energized, the electromechanical power path switch actuator causes the relay contact 93 to begin moving toward its closed position. If desired, the UPS system controller or control circuitry can also turn on the SSR. 125 at or shortly after actuator energization. When moving relay contact 93 contacts snubber contact 120, contact 93 preferably also contacts fixed output contact 134 at substantially the same time or shortly after making contact with snubber contact 120. Where not turned on upon or shortly after electromechanical power path switch actuator switch energization, the controller or control circuitry of the UPS system 60 preferably is configured in software and/or firmware to sense when relay contact 93 makes contact with snubber contact 120 and output contact 134 thereby turning on SSR 125 when contact between contact 93 and contacts 120 and/or 134 is initially made or sensed. Once snubber and output contact is made and the SSR 125 turned on, electrical current flows from source 72 through power path 68, through one transistor 126 and its corresponding connected snubber diode 130, through the other transistor 128 and its respective connected snubber diode 132, through snubber contact 120, through relay contact 93, through output contact 134, through output 74 and to load 75. Further movement or displacement of relay contact 93 by energized actuator toward away from the open position 97 toward the closed position causes relay contact 93 to begin making contact with input contact 116 while remaining closed on output contact 134. As relay contact 93 is displaced farther, it closes on input contact 116 while remaining in contact with output contact 134 causing electrical current to begin flowing through input contact 116, through relay contact 93, and through output contact 134 even when relay contact 93 is still in contact with snubber contact 120. This is because the voltage drop is lower through the current path defined by closed contacts 116, 93 and 134.

Once it is sensed or determined that electrical contact between snubber contact 120, relay contact 93 and output contact 134 has been made, control circuitry of UPS system 60 preferably is configured in software and/or firmware to cause electromechanical power path switch actuator power supply 114 to fire a braking pulse that begins stopping and preferably stops relay contact 93 from moving farther away from the open position. Once the braking process is complete, relay contact 93 preferably stops or comes to a stop in the closed position such that electrical current flows from source 72, through power path 68, through input contact 116, through relay contact 93, through output contact 134, through output 74 and to load 75. SCR 125 preferably is turned off when controller of UPS system 60 either senses relay contact 93 has broken contact with snubber contact 120 or relay contact 93 comes to a stop in contact with input contact 116 and output contact 134.

Figure 5:
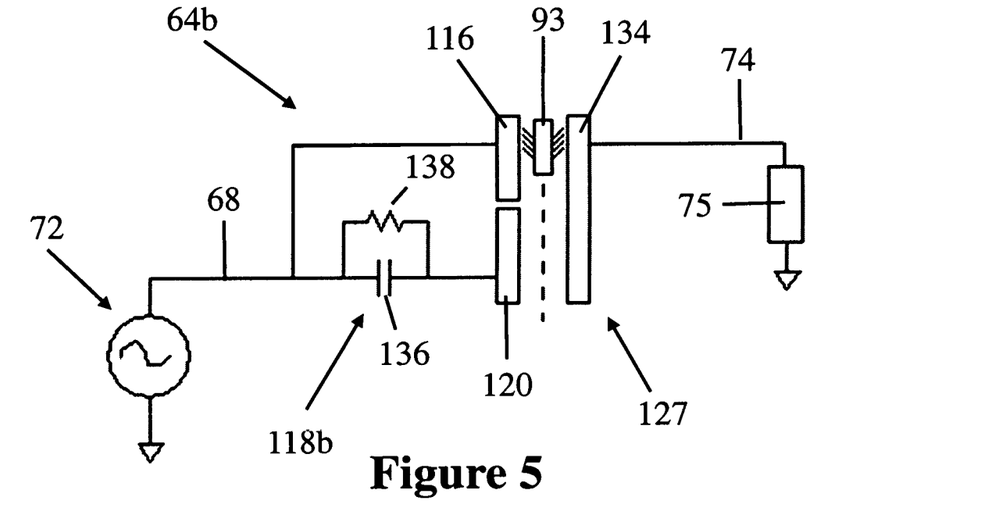
FIG. 5 is a second preferred embodiment of such a snubberized UPS power path switching arrangement that employs a passive snubber.

FIG. 5 illustrates a second embodiment of a snubberized switching arrangement 64*b* that employs a passive snubber circuit 118*b* that uses a capacitor 136 and resistor 138 in parallel and disposed between power path 68 and snubber contact 120. With continued reference to FIG. 5, the turn-off event begins with the moving contact 93 moving from the closed position toward an open position. As both output contacts 116 and 120 are closed, the snubber capacitor 136 starts at zero voltage. Main output contact 116 opens first, and since the parallel connected capacitor 136 is at zero volts, there is no arc. As time goes on as relay contact 93 moves farther, its contact gap at or with the main contact 116 increases, but because all of the load current from power path 68 is passing through capacitor 136, the capacitor voltage rises rapidly. By sizing the passive snubber capacitor 136 correctly, the increase in contact spacing between moving relay contact 93 and main output contact 116 can "outrun" the rising voltage experienced thereby to prevent an arc from forming across the main output contact 116. As the moving relay contact 93 moves farther away from the closed position toward open position, e.g., open position 99, the snubber contact 120 also opens when contact 93 breaks contact therewith. At this point there is still current flowing through the capacitor 136, so an arc forms across snubber contact 120 and possibly input contact 116 as well. The snubber contact 120 and/or moving relay contact 93 preferably are each designed to reliably withstand any arcing that might occur, such that any arcing that occurs is not a problem because the current is limited by snubber capacitor 136 to a safe voltage.

Figure 6:
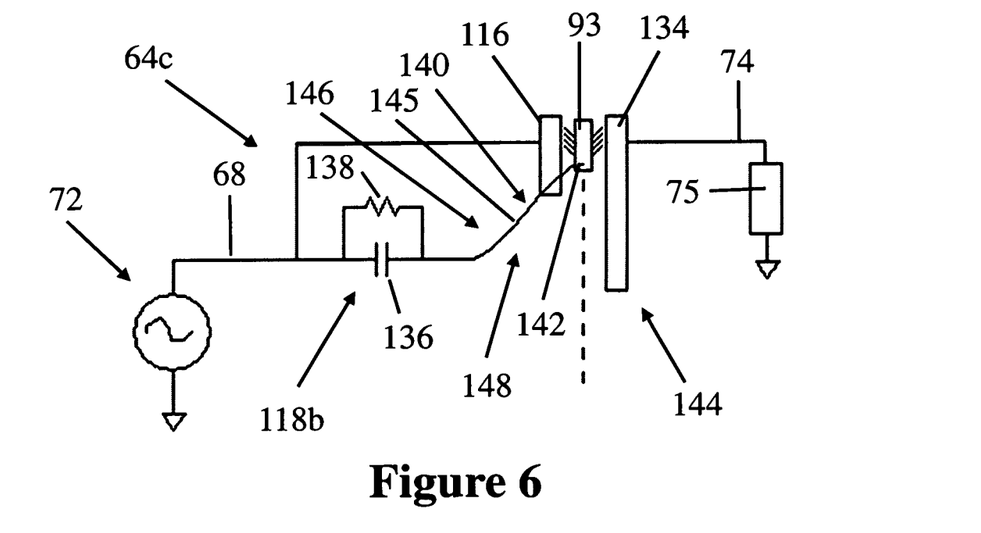
FIG. 6 is a third preferred embodiment of such a snubberized UPS power path switching arrangement that is equipped with a switch position biasing arrangement that also functions as a snubber.

FIG. 6 illustrates a third preferred embodiment of a snubberized switching arrangement 64*c* that employs the same passive snubber circuit 118*b* as shown in FIG. 5 that also uses a capacitor 136 and resistor 138 in parallel and disposed between power path 68 and snubber contact 120. The switching arrangement 64*c* depicted in FIG. 6 employs a resilient movable relay contact position biasing element 140 that preferably also can and does function as a snubber contact 142. In the preferred movable contact position biasing switching arrangement 144 shown in FIG. 6, the movable contact position biasing element 140 preferably is configured to bias movable or moving relay contact 93 towards the closed position by urging the contact 93 back to the closed position after it has been displaced to an open position, e.g., open position 97 or 99, by electromechanical actuator 66. In a preferred embodiment, resilient movable relay contact position biasing element 140 is a spring 146, preferably a bi-stable spring 148 equipped with at least one elongate resilient contact biasing spring leaf 145 that bends or flexes and remains in contact with contact 93 as the switching position of movable relay contact 93 moves from or between closed to open.

During switching during UPS system operation, when the electromechanical actuator 66 is energized, it moves movable relay contact 93 towards an open position thereby opening switch 92. When the electromechanical actuator 66 is de-energized, the movable contact position biasing element 140 automatically urges the contact 93 away from the open position towards its closed position until the contact 93 returns to the closed position shown in FIG. 6. In a preferred embodiment, the movable contact position biasing element 140 is electrically conductive having a free end that preferably is or functions as a snubbing contact 142. In such a preferred embodiment, the free end of the movable contact position biasing element 140 remains in contact with at least a portion of the movable relay contact 93 at all times including when disposed in the closed position as well as when urged into an open position. By remaining in contact with relay contact 93, including during movement between its open and closed positions, passive snubber circuit 118*b* becomes active or operational during making and breaking of contact during switch position changes. In at least one preferred embodiment, electrical contact is made by movable contact position biasing element 140 with movable contact 93 during at least break and make of contact 93 with one or both fixed contacts 116 and 134. In one such embodiment, electrical snubber or snubbing contact is made between movable relay contact position biasing element 140 and contact 93 and remains in electric contact therewith during the full range of motions and/or positions of contact 93 of switch 92 during UPS system operation.

With continued reference to FIG. 6, in a preferred embodiment, resilient movable relay contact position biasing element 140 is a spring 146, preferably a bi-stable spring 148, which can be configured to releasably latch the position of contact 93 of switch 92 in one of a plurality of positions, i.e., between its closed position and an open position disposed from its closed position. Spring 146, preferably bi-stable spring 148, is of metal or metallic and electrically conductive construction and can have its free end that defines snubber contact in slidable contact or slidable engagement with contact 93 during use and operation. In another embodiment, the free end of spring 146, preferably bi-stable spring 148, can be pivotally engaged or otherwise attached to contact 93 if desired. Operation of snubber contact 142 is similar to that described above for snubber contact 120, particularly with regard operation of snubberized switching arrangement 64*c*, except for snubber contact 142 remaining in electrical contact with contact 93 after contact 93 has broken contact with fixed input and output contacts 116 and 134. During snubber operation, contact 116 and/or 134 will arc until the rising voltage of snubber capacitor 136 snubs off arcing.

Figure 7A:
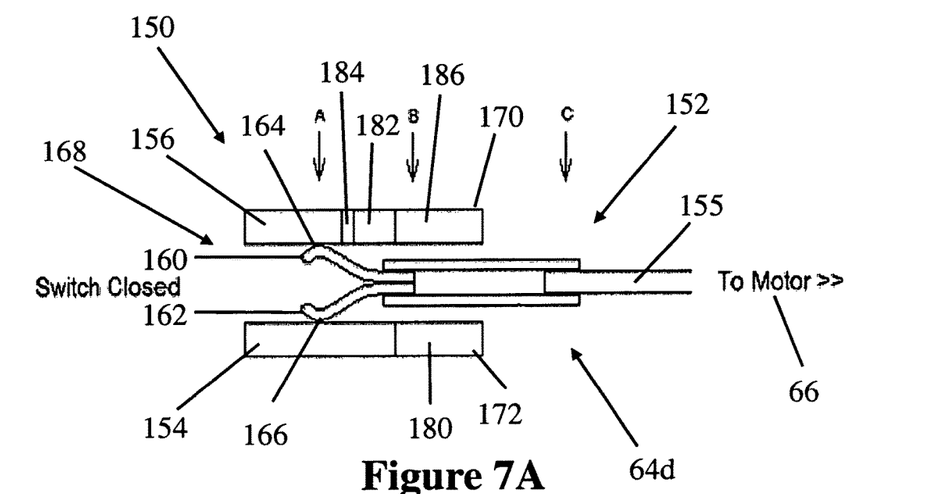
FIG. 7A is a preferred embodiment of a high speed electromechanical actuator driven switching arrangement with a switch disposed in a closed position with the switch employing a slide switch assembly with spring biased switch contacts disposed between a pair of switch guide plates respectively equipped with input and output contacts.
Figure 7B:
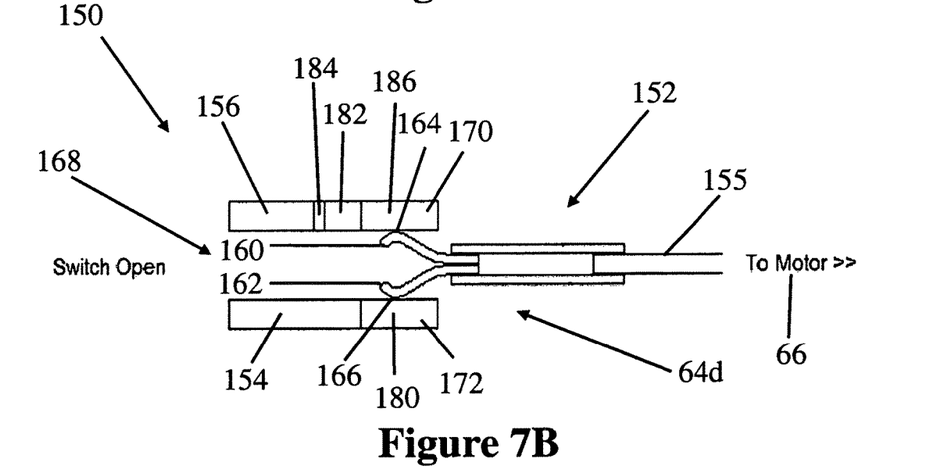
FIG. 7B depicts the high speed electromechanical actuator driven switching arrangement of FIG. 7A with the switch disposed in an open position.

FIGS. 7A and 7B illustrate a preferred construction of a preferred embodiment of a mechanical switch 150 of the present invention well suited for use as power path switching arrangement 64*d* as it can be used as or in place of switch 92 of utility power path switching arrangement 90 and/or as or in place of switch 96 of inverter power path switching arrangement 94. Switch 150 utilizes an elongate movable sliding spring relay contact assembly 152 slidably captured between fixed main input contact 154, which is electrically connected to power path 68 or 78, and fixed output contact 156, which is electrically connected to output 74. Electromechanical actuator 66, referred to as "Motor" in FIGS. 7A and 7B, is operatively connected by an elongate longitudinally extending coupler 155, preferably an electrically insulating coupler 155, to the sliding contact assembly 152 such that electromechanical actuator 66 slidably urges or moves the contact assembly 152 from a closed switch position, such as the closed position shown in FIG. 7A, to an open switch position, such as the open position shown in FIG. 7B. When the switch 150 is disposed in the closed position, electrical contact is made between main input contact 154 and output contact 156 thereby permitting current from power path 68 or 78 to flow therebetween and through output 74 where it is delivered to load 75 during operation.

The sliding spring relay contact assembly 152 has a pair of oppositely outwardly extending and biased tweezer-shaped elongate curved spring contacts 160, 162 with oppositely outwardly extending elongate curved contact surfaces 164, 166 with one contact surface 164 of one spring contact 160 disposed in electrical contact with main input contact 154 when switch 150 is closed and the other contact surface 166 of the other spring contact 162 disposed in electrical contact with output contact 156 when switch 150 is closed.

As is also shown in FIGS. 7A and 7B, the fixed contacts 154 and 156 are part of an elongate sliding contact guide 168 formed of a pair of elongate sliding spring relay contact guide plates 170, 172 which preferably are spaced apart and generally parallel to one another thereby defining a spring relay contact guideways therebetween in or along which the sliding spring contacts 160, 162 travel during opening and closing of switch 150. One of the guide plates 172 preferably has an elongate generally planar and preferably substantially smooth inner contact spring guide surface with main input contact 154 integrally forming part of the guide surface. Also forming part of guide plate 172, preferably also forming part of its inner guide surface, is an elongate generally planar and preferably substantially smooth open switch position electrical insulator 180 upon which a corresponding one of the spring contacts 162 rests when contact assembly 152 of switch 150 is disposed in an open position, such as the open position shown in FIG. 7B.

The other one of the guide plates 170 preferably also has a generally planar and preferably smooth contact spring guide surface oppositely facing the other guide surface of plate 172 with fixed output contact 156 integrally forming part of the guide surface of plate 170. Also forming part of guide plate 170, preferably also forming part of its inner guide surface, is a snubber contact 182 that can be spaced from output contact 156 by an electrical insulating contact spacer 184 and which preferably also includes an elongate generally planar and preferably substantially smooth open switch position electrical insulator 186 upon which a corresponding one of the spring contacts 160 rests when contact assembly 152 of switch 150 is disposed in an open position, such as the open position shown in FIG. 7B.

Understandably, the present invention has been described above in terms of one or more preferred embodiments and methods. It is recognized that various alternatives and modifications may be made to these embodiments and methods that are within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention.

The invention claimed is:

1. A UPS system comprised of (a) a snubber circuit having a snubber contact, (b) a mechanical switch having (i) an input comprising a pair of contacts with one of the contacts comprises a main contact connected to a source of electrical power and another one of the contacts comprising the snubber contact electrically connected to the snubber circuit, and (ii) an output comprising at least one contact electrically connected to an electrical load powered by the source of electrical power while no fault is detected, and (c) an electromechanical actuator that closes or opens the mechanical switch in no more than 8 milliseconds.

2. The UPS system of claim 1, wherein the mechanical switch is a single-throw switch that is movable from a closed position to an open position when a fault is detected.

3. The UPS system of claim 1, wherein the UPS is configurable between one of a plurality of (a) an online or double-conversion UPS operating mode, (b) an offline UPS operating mode, and (c) a line-interactive UPS operating mode.

4. The UPS system of claim 1, wherein the snubber circuit connects wherein the snubber circuit connects the main and snubber switch contacts when turned on, and wherein the snubber circuit comprises a bi-directional solid-state switch which, when the mechanical switch opens, is turned on at the onset of switching and turned off after the main contact opens, and which, when the mechanical switch closes, is turned on.

5. The UPS system of claim 1, further comprising an electrical power storage device that stores electrical power that is delivered to the electrical load upon occurrence of a UPS fault condition or loss of electrical power, and wherein electrical power stored by the electrical power storage device electrical powers the electromechanical actuator to close or open the mechanical switch in no more than 8 milliseconds.

6. A UPS system comprised of a mechanical switch and an electromechanical actuator configured to open or close the mechanical switch in no more than 8 milliseconds, wherein the UPS is configurable between one of a plurality of (a) an online or double-conversion UPS operating mode, (b) an offline UPS operating mode, and (c) a line-interactive UPS operating mode.

7. The UPS system of claim 6, wherein the UPS is reconfigurable from one of the plurality of (a) an online or double-conversion UPS operating mode, (b) an offline UPS operating mode, and (c) a line-interactive UPS operating mode to a different one of the plurality of (a) an online or double-conversion UPS operating mode, (b) an offline UPS operating mode, and (c) a line-interactive UPS operating mode.

8. The UPS system of claim 1, comprising a plurality of electrical power paths extending in parallel between an electrical power source connected to the input of the UPS and the electrical load connected to the output of the UPS, a first mechanical switch in series between the input and output in one of the plurality of electrical power paths that is configured to be opened or closed in no more than 8 milliseconds depending on operation of the UPS, and a second mechanical switch in series between the input and output in another one of the plurality of electrical power paths that is configured to be opened or closed in no more than 8 milliseconds depending on operation of the UPS.

9. The UPS system of claim 8, wherein the electromechanical actuator is in operable cooperation with the first mechanical switch and the second mechanical switch.

10. The UPS system of claim 9, wherein the electromechanical actuator drives the first mechanical switch and the second mechanical switch substantially in unison.

11. The UPS system of claim 8, wherein the first mechanical switch comprises a first switching arrangement having a movable contact movable between an open and a closed position, an input main contact in parallel with a snubber contact that makes electrical contact with the movable contact when disposed in a closed position, and a fixed output contact that makes electrical contact with the movable contact when disposed in a closed position, and wherein the first second switch comprises a second switching arrangement having a movable contact movable between an open and a closed position, an input main contact in parallel with a snubber contact that makes electrical contact with the movable contact when disposed in a closed position, and a fixed output contact that makes electrical contact with the movable contact when disposed in a closed position.

12. The UPS system of claim 1, comprising a plurality of electrical power paths extending in parallel between the electrical power source connected to the input of the UPS and the electrical load connected to the output of the UPS, a first mechanical switch in series in one of the plurality of electrical power paths that is opened or closed depending on operation of the UPS, a first electromechanical actuator configured to drive the first mechanical switch and open or close the first mechanical switch in no more than 8 milliseconds, a second mechanical switch in series in another one of the plurality of electrical power paths that is opened or closed depending on operation of the UPS, and a second electromechanical actuator configured to drive the second mechanical switch and open or close the second mechanical switch in no more than 8 milliseconds.

13. A UPS system comprised of a mechanical switch and an electromechanical actuator that opens or closes the mechanical switch in no more than 8 milliseconds, wherein the mechanical switch comprises a switching arrangement having a movable contact driven by the electromechanical actuator that is movable between an open position and a closed position, a fixed input contact in parallel with a snubber contact that make electrical contact with the movable contact when disposed in a closed position, a fixed output contact that makes electrical contact with the movable contact when disposed in a closed position, and a snubber circuit in series with the snubber contact.

14. The UPS system of claim 13, wherein the snubber circuit comprises (a) a solid state AC/DC switch that includes a solid state relay, and (b) a mechanical relay formed by the fixed input contact and the snubber contact on one side of the movable contact, and the fixed output contact on an opposite side of the movable contact.

15. The UPS system of claim 14, wherein the solid state relay comprises a snubber driver electrically connected to a pair of switching semiconductors electrically connected to each other and which each have a snubber diode connected to a pair of terminals of a corresponding switching semiconductor.

16. The UPS system of claim 13, wherein the snubber circuit comprises a resistor in parallel with a capacitor.

17. The UPS system of claim 16, wherein the snubber contact comprises a resilient movable relay contact position biasing element that biases the movable contact towards the closed position.

18. The UPS system of claim 17, wherein the resilient movable relay contact position biasing element comprises an elongate resilient contact biasing spring leaf that bends or flexes and remains in contact with movable contact as the movable contact moves between the open and closed positions.

19. The UPS system of claim 13, wherein the switching arrangement is comprised of a pair of opposed elongate movable contact guide plates that are spaced apart and generally parallel to one another with a first one of the contact guide plates having a first slidable movable contact guide surface formed of the input contact and snubber contact, and a second one of the contact guide plates having a second slidable movable contact guide surface formed of the output contact, and wherein the movable contact is disposed between the contact guide plates and slidably guided by the first and second slidable movable contact guide surfaces between an open and closed position.

20. The UPS system of claim 19, wherein a portion of the first slidable movable contact guide surface corresponding to the closed position is formed of an electrical insulator, and a portion of the second slidable movable contact guide surface corresponding to the closed position is formed of the electrical insulator.

* * * * *